Patented Apr. 6, 1943

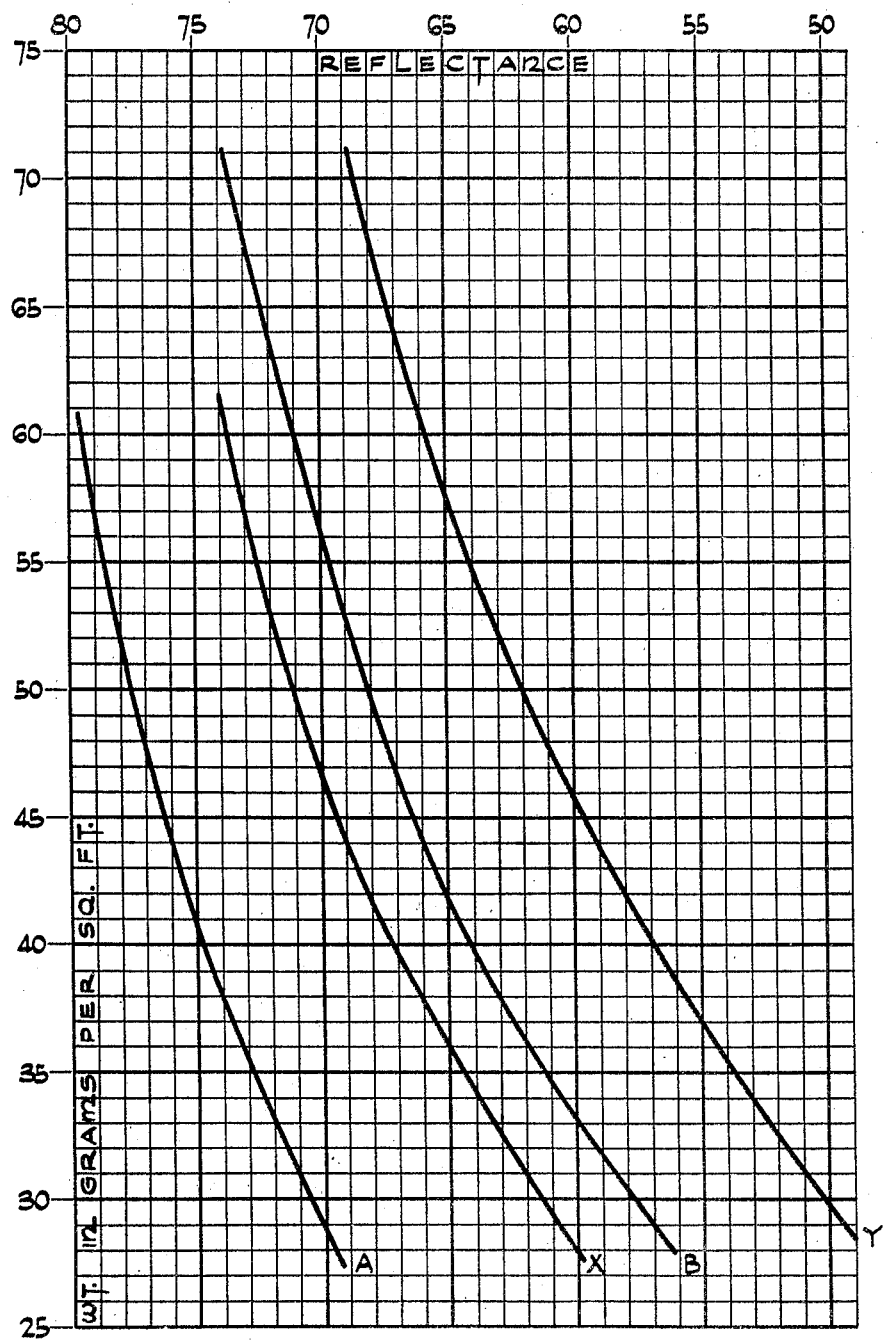

2,315,520

UNITED STATES PATENT OFFICE 2,315,520

PREPARATION OF ZIRCONIUM OXIDE

Donald S. Hake and Harold D. Prior, Niagara Falls, N. Y., assignors to The Titanium Alloy Manufacturing Company, New York, N. Y., a corporation of Maine Application October 28, 1940, Serial No. 363,110

4 Claims. (Cl. 23—140)

This invention relates to the production of zirconium oxide suitable for use as an opacifier in vitreous enamels.

Zirconium oxide has long been known as an opacifier for vitreous enamels. In its use as such, it is customarily milled with an enamel frit and water, and the slip thus formed applied to a suitable base, such as iron, and fired. For best results, the physical form and particle size of the zirconium oxide is of great importance, and even exceptionally pure and white zirconium oxide does not give good results if the particle size is of the wrong order. Thus, it has been found that particle sizes between 0.4 and 1 micron are the most effective in securing proper opacity. In accordance with this invention, there is provided a new and improved method of securing zirconium oxide, of the required particle sizes, highly useful as an opacifier for vitreous enamels.

In substance, this new and improved method comprises, in its preferred form, heating 1 part of a suitable sodium zirconium silicate, or an acid soluble compound formed by roasting zircon with an alkali such sodium carbonate, with about 4 parts of molten caustic soda, allowing the melt thus formed to cool and solidify, leaching with water and acid, drying and calcining.

The sodium zirconium silicate, or acid-soluble compound from zircon, is preferably formed by the method described and claimed in Kinzie Patent No. 1,609,826. In this method, equal quantities of finely-milled zircon and sodium carbonate are roasted together at a temperature of 900° to 950° C., until a thorough conversion results. A mixture containing less than 0.6 part of soda ash to 1 part of zircon tends to leave unreacted zircon in the product, while a ratio of soda ash to zircon greater than 2 to 1 increases the $SiO_2$ content and the particle size of the final product. The resulting product is wet milled to —325 mesh, washed, dried and pulverized. The washing is conveniently accomplished by stirring with 5 parts of water to 1 part of roast, settling and decanting. The operation is repeated twice. The washed slurry is dried and pulverized to pass at least 100 mesh and preferably fine enough to pass a 200 mesh screen.

The sodium zirconium silicate thus formed is then ready for further processing according to this invention. It is added to molten caustic soda, which is maintained at a temperature between 500° and 750° C., in the proportion of at least 2½ parts of caustic soda to 1 part of the roasted product as prepared above, and preferably in a ratio of about 4 to 1. There may also be added to the melt a small quantity of borax, such as 5% of the weight of the sodium zirconium silicate. This serves to still further improve the product, as will be shown hereafter.

The melt is maintained at the required temperature, after the addition of the sodium zirconium silicate, until all reaction ceases and the melt is quiet. The finished melt is then poured out upon a metal tray, preferably of nickel, and allowed to cool and solidify.

The fusion cake is then washed. This is conveniently accomplished by leaching with water, preferably in the ratio of at least 4 parts of water to 1 part of fusion cake, stirred and allowed to settle. The supernatant liquor, which contains excess free caustic and other soluble compounds, is then drawn off. This washing step is repeated several times, until the product is free of soluble alkali silicates and alkalies. The last remaining soluble material can be removed by treatment with dilute hydrochloric acid, followed by washing to remove acid and acid salts.

The aqueous slurry is then dried and calcined, such as at a temperature of 600° to 800° C., to remove all but a trace of tenaciously held water. If the calcination is conducted above 650° C. the ignition loss of the product is practically nil. The resulting product has particles the major portion of which are under 1 micron in size, while the average is from 0.5 to 0.8 micron.

The invention having been described, the following illustrative examples are given:

Example 1

100 grams of soda ash is admixed with 100 grams of —325 mesh zircon. This is reacted at 900° for two hours. The roast is wet milled to —325 mesh and washed twice by diluting 5 to 1, settling and decanting. The slurry is dried and pulverized to pass 200 mesh. The sodium zirconium silicate thus formed has approximately the following composition: 52.42% $ZrO_2$, 25.08% $SiO_2$, 21.75% $Na_2O$. 100 grams of this material is added and stirred into 400 grams of caustic soda previously heated at 600° C. for thirty minutes in a nickel crucible. The mixture is reacted for thirty minutes at 600° C. and cast upon a nickel tray. The frozen cake is leached in 4 liters of water, stirred up to a smooth fluid, allowed to settle, and then decanted. This is repeated four times. In the last repetition, 50% aqueous hydrochloric acid is added drop by drop until the slurry remains acid to litmus. It is settled and decanted, followed by one more wash. The slurry is dried at 130° C. and calcined at 600° C. This gives a white zirconium oxide of excellent opaquing powers, of chemical and physical properties described above, and having approximately the following analysis:

| | Per cent |
|---|---|
| Ignition loss | 1.50 |
| $Na_2O$ | 0.005 |
| CaO | 0.30 |
| $SiO_2$ | 1.1 to 2.7 |
| $TiO_2$ | 0.01 |
| $ZrO_2$ | Balance |

*Example 2*

The same procedure was followed as in Example 1, except that 5 grams of dehydrated borax were added to the melt along with the sodium zirconium silicate.

It is well known in the art that zirconium oxides and more particularly so-called hydrous soda-containing zirconium oxide can be made by direct fusion of zirconium silicate with caustic soda or soda ash or mixtures of the same. Experience has shown that these processes, although yielding zirconium oxides relatively low in $SiO_2$ (3 to 12%), do not yield a product useful in opacifying vitreous enamels. The particle size has been found to be too coarse. In the caustic fusion of zircon the particle size of the final product was found to be generally above one micron, while for best opaqing power an opacifier should have particle sizes of less than 1 micron and preferably in the range of 0.5 to 0.8 micron.

The opaquing power of the new zirconium oxide is best illustrated in the accompanying drawing showing graphically the results obtained in enameling tests in which the opacifiers under test were milled with typical frits, clay, water, etc., and applied to an iron base at the rate of application shown on the graph. The opacity or reflectance was measured by generally accepted means for determining this property in enamels.

In curves A and B the opacifier used was prepared according to Example 1. In curves X and Y the opacifier was prepared by direct fusion of zirconium silicate with sodium hydroxide, followed by water and acid leaches to remove most of the silica and soda, resulting in a product of the following composition:

| | Per cent |
|---|---|
| Ignition loss | 1.55 |
| $Na_2O$ | 0.005 |
| CaO | 0.6 |
| $SiO_2$ | 6.0 |
| $TiO_2$ | 0.01 |
| $ZrO_2$ | Balance |

This material was typical of previously known opacifiers, having particles the majority of which were over 1 micron in size, with some as high as 10 microns and the average 2 to 3 microns.

Except for the opacifiers used, the procedure and composition employed in the enamels of curves A and X were identical. Similarly, except for the opacifiers used, the procedure and composition employed in the enamels of curves B and Y were identical.

In A and X, 100 parts of an antimony-free frit containing zirconium in the frit were milled with 7 parts of enameler's clay, 2½ parts of opacifier, 1/16 part of $NaNO_2$, and 40 parts of water. This was milled to a fineness of 2 grams residue on a 200 mesh screen from a 100 cc. sample. The enamel was fired for 2½ minutes at 1520° F.

In B and Y, 100 parts of an antimony-containing frit commonly used in enameling sheet iron ware were milled with 6 parts of enameler's clay, 6 parts of opacifier, ¼ part of $MgCO_3$, and 40 parts of water. This was milled to a fineness of 10 grams residue on a 200 mesh screen from a 100 cc. sample. The enamel was fired for 2½ minutes at 1500° F.

The material according to Example 2 was also tested, but for the sake of clarity the results of this test are not shown in the graph. The reflectance readings at 30 grams per sq. ft. were approximately the same as with the material according to Example 1, but at 60 grams per sq. ft. were about 2 points higher than with Example 1.

As many variations are possible within the scope of this invention, it is not intended to be limited except as defined by the appended claims.

We claim:

1. A method of preparing zirconium oxide suitable for use as an opacifier for vitreous enamels, comprising mixing sodium zirconium silicate with at least 2½ parts of molten caustic soda to each part of sodium zirconium silicate, solidifying, leaching out soluble sodium and silicon compounds with water and acid, drying, and calcining.

2. A method of preparing zirconium oxide suitable for use as an opacifier for vitreous enamels, comprising mixing sodium zirconium silicate with at least 2½ parts of molten caustic soda to each part of sodium zirconium silicate at a temperature of 500° to 750° C., solidifying, leaching out soluble sodium and silicon compounds with water and acid, drying, and calcining at a temperature of 600° to 800° C.

3. A method of preparing zirconium oxide suitable for use as an opacifier for vitreous enamels, comprising mixing sodium zirconium silicate containing a minor quantity of borax with at least 2½ parts of molten caustic soda to each part of sodium zirconium silicate, solidifying, leaching out soluble sodium and silicon compounds with water and acid, drying, and calcining.

4. A method of preparing zirconium oxide suitable for use as an opacifier for vitreous enamels, comprising mixing sodium zirconium silicate containing a minor quantity of borax with at least 2½ parts of molten caustic soda to each part of sodium zirconium silicate at a temperature of 500° to 750° C., solidifying, leaching out soluble sodium and silicon compounds with water and acid, drying, and calcining at a temperature of 600° to 800° C.

DONALD S. HAKE.
HAROLD D. PRIOR.